United States Patent [19]

Hinton

[11] Patent Number: 5,344,483

[45] Date of Patent: Sep. 6, 1994

[54] HIGH-DENSITY, LOW-VISCOSITY INK FOR USE IN INK JET PRINTERS

[75] Inventor: Stephanie S. Hinton, Cookeville, Tenn.

[73] Assignee: Porelon, Inc., Cookeville, Tenn.

[21] Appl. No.: 860,098

[22] Filed: Mar. 30, 1992

[51] Int. Cl.$^5$ ............................................. C09D 11/02
[52] U.S. Cl. ................................ 106/22 R; 106/20 D; 106/22 D; 106/22 E; 106/28 R
[58] Field of Search ...... 106/20 R, 19 F, 20 A–20 D, 106/22 R, 22 D, 22 E, 29 R; 8/580, 938

[56] References Cited

U.S. PATENT DOCUMENTS

| | | | |
|---|---|---|---|
| 4,361,843 | 11/1982 | Cooke et al. | 346/1.1 |
| 4,386,961 | 6/1983 | Lin | 106/22 |
| 4,484,948 | 11/1984 | Merritt et al. | 106/31 |
| 4,531,976 | 7/1985 | Lin | 106/27 |
| 4,714,934 | 12/1987 | Rogers | 346/140 R |
| 4,793,264 | 12/1988 | Lin et al. | 106/22 H |
| 4,819,009 | 4/1989 | Kniepkamp | 346/75 |
| 4,822,418 | 4/1989 | Lin et al. | 106/27 |

OTHER PUBLICATIONS

*Color Index*, Third edition, vol. 3, 1971, publisher: The Society of Dyers and Colourists p. 3642.

*Primary Examiner*—Paul Lieberman
*Assistant Examiner*—Margaret Einsmann
*Attorney, Agent, or Firm*—Foley & Lardner

[57] ABSTRACT

An ink composition suitable for ink jet printing is made from a fatty acid ester base and a diluent, wherein the base consists essentially of a fatty acid which is liquid at room temperature, a polyalkylene glycol, and a dye which has been reacted with the fatty acid to form an ester. The base is combined with a compatible diluent, such as an alcohol having a low-viscosity and low vapor pressure, to provide an ink composition especially suited for ink jet dot printing of high-definition symbols such as bar codes. The ink of the invention resists spreading on rough surfaces, and thus can be used to print bar codes directly on the sides of paperboard cartons.

20 Claims, No Drawings

HIGH-DENSITY, LOW-VISCOSITY INK FOR USE IN INK JET PRINTERS

FIELD OF THE INVENTION

This invention relates to printing inks, in particular, to inks for use in ink jet printing of alphanumeric characters and symbols such as bar codes.

BACKGROUND OF THE INVENTION

Ink jet printing has become increasingly common as a method for rapid printing of high-definition characters and symbols. In one application, an ink jet printer is used to print optically-scanable bar codes. See, for example, Rogers U.S. Pat. No. 4,714,934, issued Dec. 22, 1987 and Kniepkamp U.S. Pat. No. 4,819,009, issued Apr. 4, 1989. Such bar codes must be printed with both high contrast and high clarity to ensure that scans succeed 99.9% of the time. This is relatively easy on ordinary paper, but becomes more difficult on rough surfaces such as paperboard due to surface irregularities and wicking of the ink. Thus, the printing of bar codes directly on the sides of paperboard cartons requires an ink which resists wicking and which provides a clear, precise image.

Oleate bases are widely used in the ink industry as a means of solvating dyes and producing liquid colorants that can be augmented and used in a variety of printing applications, including writing and printer ribbon inks. Unfortunately, oleic-acid based inks generally give poor print quality due to severe bleed and ink spread on porous papers and substrates. Spread of the imprint also causes the print to lose intensity and look more grey. Bar coding applications require a predetermined minimum intensity of the imprint for scanner recognition.

A variety of specific ink compositions containing oleic acid and other fatty acids and fatty acid esters are known. Ink jet inks based on oleic acid and other fatty acids, generally in combination with an alcohol or glycol, are described in Lin U.S. Pat. No. 4,531,976 issued Jul. 30, 1985, Cooke et al. U.S. Pat. No. 4,361,843, issued Nov. 30, 1982, and Merritt et al. U.S. Pat. No. 4,484,948, issued Nov. 27, 1984. Nigrosine dyes have been used in connection with ink jet ink formulations containing oleic acid; see Lin et al. U.S. Pat. No. 4,822,418, issued Apr. 18, 1989.

Lin U.S. Pat. No. 4,386,961, issued Jun. 7, 1983, describes an ink containing 1–10 wt. % oleic acid, 30–45 wt. % diethylene glycol or a (poly)$_n$ethylene glycol, wherein n is from 1 to 5, and 37–45 wt. % of a methoxy triglycol as a common solvent. However, the dyes disclosed are the type which dissolve in the solvent and do not react with the oleic acid to form an ester.

The use of antioxidants in oleic acid-based inks is also known. Antioxidants have been used in certain types of fatty acid-based ink jet inks; see Lin et al. U.S. Pat. No. 4,793,264, issued Dec. 27, 1988. Such antioxidants have been used to prevent corrosion of the ink jet nozzles.

Despite the variety of fatty acid-based ink formulations available, a need remains for ink jet ink compositions having superior printing characteristics, particularly for use in printing bar codes on rough surfaces such as paperboard cartons.

SUMMARY OF THE INVENTION

An ink suitable for ink jet printing according to the invention contains a fatty acid ester base and a diluent. The base consists essentially of a fatty acid which is liquid at room temperature, a polyalkylene glycol, and a dye which is combined with the fatty acid to form an ester. A high print density, low viscosity ink according to the invention is suitable for use in piezoelectric-drive ink jet print heads. Such an ink may be used in a method of printing a bar code or other symbol according to the invention using an ink jet printer, particularly on a rough surface such as paperboard. Droplets of the ink are ejected from the print head in accordance with a predetermined sequence in a manner well known in the art.

The invention further provides a process for making an ink jet ink by first forming a mixture of a fatty acid which is liquid at room temperature, a polyalkylene glycol, and a dye capable of reacting with the fatty acid to form an ester. The mixture is heated to a temperature sufficient to cause the dye and fatty acid to react to form the ester and for a time sufficient to drive off excess water from the mixture and to allow the esterification reaction to proceed to substantial completion. The base mixture is then combined with the diluent such as a glycol ether to form the ink composition.

DETAILED DESCRIPTION

According to one aspect of the invention, a modified dye/fatty acid/glycol that mixed with a low-vapor pressure glycol ether results in a high-density, low-viscosity ink suitable for use in piezoelectric-drive ink jet print heads. Ink spread and bleed are related to ink viscosity, i.e., thin inks can penetrate and travel farther in or on substrates than thicker inks. Glycols improve clarity of print by decreasing ink spread and bleed. However, a preferred dye according to the invention, Solvent Black 7, has only moderate solubility in glycols. Typically, only 10–15 wt. % dye solutions can be obtained without saturation.

A preferred ink composition of the invention provides a high definition ink which resists spreading. Such a composition comprises a fatty acid ester base and a diluent, wherein the base consists essentially of 30 to 90 wt. % of a saturated or unsaturated fatty acid which is liquid at room temperature, 10 to 50 wt. % of a polyalkylene glycol having an average molecular weight of at least about 200, and 5 to 40 wt. % of a dye which reacts with the fatty acid to form an ester. The diluent is a liquid compatible with the base that provides the desired viscosity and flowability.

It has been found that polyalkylene glycols have significant advantages over simple glycols such as diethylene glycol when employed in the ink composition of the invention wherein the dye is combined with a fatty acid. The polyalkylene glycol of the invention is preferably a polyethylene glycol (PEG) of the formula HO—CH$_2$CH$_2$—(CH$_2$CH$_2$O)$_n$—CH$_2$CH$_2$—OH, wherein n is at least 1, typically from 1 to about 14, preferably having an average molecular weight of at least 200, generally from about 200 to 600. A comparable polypropylene or polybutylene glycol could also be employed.

Tests of inks according to the invention using a polyethylene glycol having an average molecular weight of approximately 200 indicated that the PEG had greater solubility for nigrosine base dye than other glycols, such as diethylene glycol and triethylene glycol. It is also more compatible with printhead components such as nickel coatings, aluminum, vitons and various adhesives.

The fatty acid used in the ink of the invention preferably consists essentially of one or more $C_{17}$–$C_{19}$ saturated or unsaturated fatty acids, particularly oleic or isostearic acid, or a mixture of unsaturated and/or saturated fatty acids, for example, natural oils such as peanut or olive oils, with only a minor proportion (less than 50 wt. %) of polyunsaturated fatty acids. The fatty acid reacts with the dye to form an ester, such as an oleate. The amount of the fatty acid is preferably at least approximately the stoichiometric amount needed to react with the dye. In the case of a nigrosine dye reacting with a $C_{17}$–$C_{19}$ fatty acid, especially oleic or isostearic acid, the fatty acid:dye weight ratio is at least about 1.5:1, preferably at least about 2:1.

Oleic acid is not obtainable commercially as a pure material; it comes as a mixture with other fatty acids with varying degrees of saturation (presence or absence of double bonds in the molecule) and varying carbon chain lengths. Fatty acids such as oleic acid are prone to oxidation over time and exposure to heat. Oxidation breaks down double bonds present in oleic acid (one double bond) and especially in one of its most common contaminants, linoleic acid (two double bonds). Oxidation results in odor change, color darkening, and most importantly, viscosity increase. For this reason, a specific grade of oleic acid, Emery 233LL, containing approximately one-half the linoleic acid content typically found in commercial grades of oleic acid, is preferred. This gives the resulting ink a longer shelf life.

The base further optionally contains 0.1 to 1 wt. %, preferably about 0.1 to 0.4 wt. %, of an antioxidant effective to suppress heat-initiated oxidation of the unsaturated fatty acid. The antioxidant is, for example, a phenolic compound such as Cyanox 2246, a phenolic antioxidant compound from American Cyanamid. Butylated hydroquinone as taught by Lin U.S. Pat. No. 4,793,264 could also be used, but larger amounts are generally needed.

The dye used may be any suitable dye that can dissolve in the fatty acid, e.g., oleic acid, and react with the fatty acid to form an ester, most preferably a black Nigrosine base dye, most preferably Solvent Black 7. Solvent Black 7 is an organic dye with excellent solubility in fatty acids, especially oleic acid. Solvent Black 7 is most preferred due to its spectral characteristics; it is one of the few solvent dyes that absorb light in the near infrared range (950 nanometers). This is especially important as it relates to the printing of bar codes which will be scanned by infrared scanners. Solvent Black 7 is also the colorant of choice due to its low corrosivity, unlike some of the nigrosine dye salts, which contain chlorides and sulfates. Other useful dyes include Solvent Red 49, Solvent Violet 8, and Solvent Blue 5. Combinations of different dyes, especially one or more colored dyes such as the foregoing with Solvent Black 7, can be used to shade and/or brighten Solvent Black 7 to improve readability.

The ester base of the invention incorporating the polyalkylene glycol and the fatty acid as the solvent system is preferably heated to give the base a "heat history" that exceeds the operating temperature of the ink when jetted, and to eliminate the water generated through the reaction of oleic acid and dye. Accordingly, a process for making an ink jet ink composition of the invention includes steps of (1) forming a mixture of a fatty acid which is liquid at room temperature, a polyalkylene glycol, and a dye capable of reacting with the fatty acid to form an ester, (2) heating the resulting mixture to a temperature sufficient to cause the dye and fatty acid to react to form the ester and for a time sufficient to drive off excess water from the mixture, and then (3) combining the mixture with the diluent to form the ink composition.

The solvation of the dye of the invention in oleic acid is a product of the esterification reaction of the acid which generates water as a byproduct. In order to drive this reaction to completion and eliminate the water, which the dye is very insoluble in, the mixture of dye, fatty acid and glycol are heated to a temperature above the boiling point of water, e.g., in the range of about 100°–122° C. (212°–250° F.) for at least about 30 minutes, usually 0.5 to 1 hour, preferably with agitation. The glycol is preferably present at this stage in order ensure complete dissolution of the dye and allow any byproduct-forming reactions to take place.

After heating, the base is then diluted with the diluent to a suitable concentration for use in ink jet printing. The diluent is an alcohol having a relatively low viscosity and vapor pressure. A vapor pressure of about 0.06 mmHg or less at 20° C., preferably less than 0.01 mmHg at 20° C., and a viscosity of about 10 cps or less, are most preferred to retard evaporation of the ink in the printing head of the ink jet printer. Useful alcohols include glycol ethers such as a (lower alk)oxytriglycol, preferably methoxytriglycol, diethylene glycol ethers (carbitols) and aromatic alcohols such as benzyl alcohol.

Glycol ethers are preferred because these liquids are compatible, miscible diluents for the ester base and have several other desirable characteristics, including good dye solubility, low vapor pressure (will not evaporate easily), high flash point (low flammability), low spread and bleed characteristics on porous paper surfaces, and low viscosity. All of these qualities affect the performance of the ink in ink jet printing. The low spread characteristics of the glycol ether are especially important for producing imprints that give good clarity and definition, particularly for bar coding, where bar and space widths must remain within critical tolerances for correct decoding of the code. Methoxytriglycol is most preferred because it has the lowest viscosity of the various (lower alk)oxytriglycols. This allows more oleate base in the final ink for the darkest print with the lowest final viscosity.

A highly preferred ink composition according to the invention consists essentially of 30 to 70 wt. % of an oleate or isostearate base and the balance (70 to 30 wt. %) of the glycol ether diluent, preferably methoxytriglycol, wherein the oleate base consists essentially of 40 to 75 wt. % of oleic or isostearic acid, 10 to 30 wt. % of a polyethylene glycol of the formula $HO-CH_2CH_2-(CH_2CH_2O)_n-CH_2CH_2-OH$, wherein n is at least 1, and having an average molecular weight of at least about 200, 20 to 35 wt. % of a dye, such as a nigrosine base dye, which reacts with the fatty acid to form an ester, and optionally up to 1 wt. % of an antioxidant effective to suppress heat-initiated oxidation of oleic or isostearic acid. The foregoing relative amounts provide optimum characteristics for ink jet printing as discussed above. Inks for ink jetting in this application are generally heated to achieve an operating viscosity of less than 15 centipoise. An ink according to the invention preferably has a viscosity in the range of 9 to 15 cps at 60° C. to provide optimum jetting characteristics.

A method of printing a bar code using an ink jet printer according to the invention includes the step of ejecting droplets of the ink of the invention from the printer to print bars on a surface. The ink of the invention resists spreading on rough surfaces, and thus can be used to print bar codes directly on the sides of paperboard cartons. Conditions for printing readable bar codes on rough surfaces are described in commonly-assigned copending application Ser. No. 07/807,803, filed Dec. 13, 1991, continuation of Ser. No. 07/257,077, filed Oct. 13, 1988, abandoned, the entire contents of which applications are incorporated herein by reference.

It will be understood that the foregoing description is of preferred exemplary embodiments of the invention, and that the invention is not limited to the specific forms shown. Modifications may be made in the method and ink of the invention without departing from the scope of the invention as expressed in the appended claims.

The following example illustrates preparation of an ink composition according to the invention:

EXAMPLE

An oleate base composition was first prepared. The ingredients listed below were mixed at about 220°-250° F. for 30 minutes with a high-shear mixer (amounts are by weight):

| | |
|---|---|
| Oleic Acid (Emery 233LL) | 50.25% |
| Polyethylene Glycol 200 | 20.00% |
| Solvent Black 7 | 29.50% |
| Antioxidant (Cyanox 2246) | 0.25% |

This oleate base composition was then combined with an equal amount (50:50 parts by weight) of methoxytriglycol as a diluent, cooled and stored for later use.

What is claimed is:

1. An ink composition suitable for ink jet printing consisting essentially of a fatty acid ester base and a diluent, wherein the base consists essentially of a fatty acid which is liquid at room temperature, a polyalkylene glycol, and a dye which has been reacted substantially completely with the fatty acid to form an ester, wherein the ink composition is essentially free of water, and the water resulting from the esterification having been eliminated in order to drive the esterification reaction substantially to completion.

2. The ink composition of claim 1, wherein the base consists essentially of 30 to 90 wt. % of the fatty acid, 10 to 50 wt. % of the polyalkylene glycol, the polyalkylene glycol having an average molecular weight of at least about 200, and 5 to 40 wt. % of the dye, and the diluent is an alcohol having a viscosity of about 10 cps or less at 20° C. and a vapor pressure of about 0.06 mmHg or less at 20° C.

3. The composition of claim 2, wherein the fatty acid consists essentially of one or more $C_{17}$-$C_{19}$ fatty acids.

4. The composition of claim 3, wherein the ink composition consists essentially of about 30 to 70 wt. % of the base and 70 to 30 wt. % of the diluent.

5. The composition of claim 4, wherein the fatty acid consists essentially of oleic acid.

6. The composition of claim 4, wherein the fatty acid consists essentially of isostearic acid.

7. The composition of claim 4, wherein the polyalkylene glycol is a polyethylene glycol of the formula $HO-CH_2CH_2-(CH_2CH_2O)_n-CH_2CH_2-OH$, wherein n is from 1 to 14.

8. The composition of claim 7, wherein the base further comprises 0.1 to 1 wt. % of an antioxidant effective to suppress heat-initiated oxidation of the fatty acid.

9. The composition of claim 8, wherein the antioxidant is a phenolic compound.

10. The composition of claim 7, wherein the dye is a nigrosine base dye, and the fatty acid:dye weight ratio is at least about 1.5:1.

11. The composition of claim 10, wherein the diluent is a glycol ether.

12. The composition of claim 11, wherein the diluent is an alkoxytriglycol.

13. The composition of claim 12, wherein the diluent consists essentially of methoxytriglycol.

14. The composition of claim 1, wherein the ink composition has been made by:
  forming a mixture of the fatty acid which is liquid at room temperature, the polyalkylene glycol, and the dye capable of reacting with the fatty acid to form an ester;
  heating the resulting mixture to a temperature sufficient to cause the dye and fatty acid to react with each other to form the ester and for a time sufficient to drive off excess water from the mixture so that the ink composition is substantially free of water; and
  then combining the mixture with the diluent to form the ink composition.

15. The composition of claim 14, wherein the mixture is heated to a temperature of at least about 100° C. for at least about 30 minutes.

16. An ink composition consisting essentially of 30 to 70 wt. % of an oleate or isostearate base and the balance is essentially a glycol ether diluent, wherein the base consists essentially of:
  40 to 75 wt. % of oleic or isostearic acid;
  10 to 30 wt. % of a polyethylene glycol of the formula $HO-CH_2CH_2-(CH_2CH_2O)_n-CH_2CH_2-OH$, wherein n is at least 1, and having an average molecular weight of from about 200 to 600;
  20 to 35 wt. % of a dye which has been reacted substantially completely with the acid to form an ester; and
  up to 1 wt. % of an antioxidant effective to suppress heat-initiated oxidation of the acid; and
  wherein the ink composition is substantially free of water, the water resulting from the esterification having been eliminated in order to drive the esterification reaction substantially to completion.

17. The composition of claim 16, wherein the dye consists essentially of Solvent Black 7.

18. The composition of claim 17, wherein the diluent consists essentially of methoxytriglycol.

19. The composition of claim 16, wherein the ink composition has been made by:
  forming a mixture of the oleic or isostearic acid, the polyethylene glycol, and the dye;
  heating the resulting mixture to at least about 100° C. for at least about 30 minutes to cause the dye and acid to react with each other to form the ester and drive off excess water from the mixture; and
  then combining the mixture with the glycol ether diluent to form the ink composition.

20. The composition of claim 19, wherein the dye consists essentially of Solvent Black 7 and the diluent consists essentially of methoxytriglycol.

* * * * *